I. BOONE.
Hog-Dressing Machine.
No. 201,385. Patented March 19, 1878.
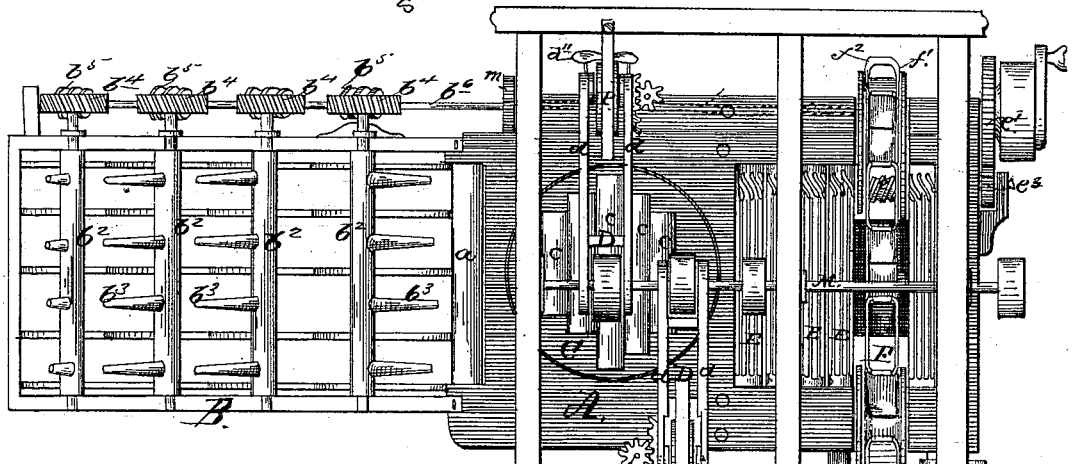
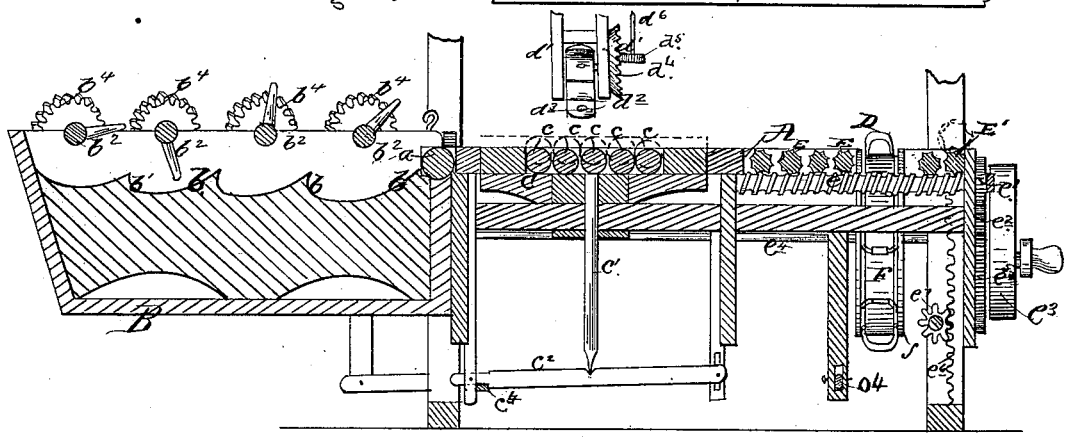
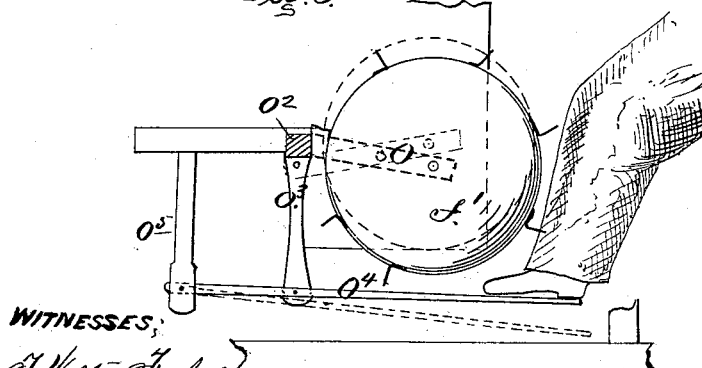
WITNESSES:
J. Walter Fowler
Harvey Fowler
INVENTOR
Isaac Boone
per J. J. Kirk
his attorney

UNITED STATES PATENT OFFICE.

ISAAC BOONE, OF TROY, OHIO.

IMPROVEMENT IN HOG-DRESSING MACHINES.

Specification forming part of Letters Patent No. 201,385, dated March 19, 1878; application filed October 30, 1877.

*To all whom it may concern:*

Be it known that I, ISAAC BOONE, of Troy, in the county of Miami and State of Ohio, have invented certain new and useful Improvements in Hog-Dressing Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to certain additional improvements in my improved hog-dressing machine for which Letters Patent No. 194,404 were granted to me August 21, 1877, in the specification of which the parts are referred to by letters, and described precisely the same as in the following specification, except in the following my present improvements are added and described.

Figure 1 is a top view. Fig. 2 is a section horizontally through the machine. Fig. 3 shows the working parts of the foot-lever, and Fig. 4 is a detached view of the scraper or knife.

A is the frame or table of my machine. Upon one end of this frame is mounted the scalding trough or vat B, as shown, the said trough being preferably detachable from the frame, so that it may be conveniently emptied and cleansed when required. This vat is made comparatively shallow, and upon its bottom are arranged projecting ribs $b$, extending the length of the vat, and having their upper edges made with a succession of deep and wide curved notches or depressions $b^1$, the notches of one rib being in line with those of the other ribs, respectively, as shown.

Extending across the vat transversely are arranged a series of shafts, $b^2$, having bearings in the side of the vat. These shafts are arranged one over each of the depressions $b^1$, and they are provided each with projecting arms $b^3$, arranged on opposite sides of the shafts, preferably in pairs, diametrically opposite to each other. These shafts have spiral gears $b^4$ on one side, which mesh into perpetual gears $b^5$ on the shaft $b^6$. This perpetual gear causes spiral gear $b^4$ to revolve very slow, thus giving a slow revolution to shaft $b^2$, and giving greater length of time for the scalding of the hog. By means of this arrangement of parts, when the hog, after being killed, is placed in the scalding-vat B, at the outer end thereof, it is carried along toward the table A by the arms $b^3$ of the shaft $b^2$ being passed over from one to another of the depressions in the ribs on the bottom of the vat, so that both sides of the hog are alternately entirely immersed in the vat twice, and the hog thus thoroughly scalded. The hog is passed by the last of these shafts $b^2$ onto the top of the table A over, assisted by a roller, $a$, which revolves freely in bearings on the table at its end nearest the vat, as shown.

The hog is now cleaned and scraped as follows: In an opening in the top of the table A is arranged a circular table or disk, C, in the upper face of which are a series of free rollers, $c$, to facilitate the movement of the hog upon and across said disk, the said table or disk C being free to revolve in its opening on its pivoted standard $c^1$, which has a bearing on the cross-beam $c^2$, that is operated to be raised or lowered by foot-lever $c^4$, arranged conveniently beneath the table A, as shown. By this means the hog may be readily and easily turned on table C to any desired position while being scraped, while by pressing on the foot-lever $c^4$ the hog may be forced upward into a closer contact with the scraper.

D is the scraping device, which is formed of the frame $d$, conveniently hinged upon the main shaft M, and arranged to extend horizontally therefrom over the revolving table C and a frame, $d^1$, which is hinged to the frame $d$, at the end thereof, and depends over the said table C, the said frame $d^1$ carrying at its lower end the scraper-wheel $d^2$, having upon its rim the scraping-knife $d^3$, and arranged to be rapidly revolved in bearings in said frame by gear $d^4$ engaging gear $d^5$ on shaft $d^6$, having bearings in hangers fixed on said frame by gear $d^4$, said shaft carrying at its upper end gear $d^7$, which engages gear $d^8$ on shaft at the free end of frame $d$, which said shaft carries a pulley, $d^9$, moved by a belt from the pulley on the shaft M.

Upon the front of the frame $d^1$ is fixed a handle, $d^{11}$. By this arrangement of parts it is evident that the scraping-knives $d^3$, while being rapidly revolved, may, by the operator, be carried forward or backward, and raised or lowered, as may be desired; and that, by means of this free movement of the scraper, in connection with the free movement of the revolving table C, the hog may be easily and quickly cleaned of his bristles.

To facilitate raising and lowering of the scraping device D, a spring, P, is secured to one end of frame Q, thence extends horizontally to a point above the outer end of frame $d$, where it is connected to said outer end by a short chain or other suitable means. Thus the weight of the scraping device D is supported by said spring P, which spring has sufficient elasticity to allow the scraping device D to be pressed downward, and yet strength enough to relieve the operator of the weight of the device by letting it upward.

After being scraped, the hog is delivered from the revolving table C onto the set of toothed or corrugated rollers E, which are set transversely in an opening in the table A, and revolve in bearings therein, and are operated by a screw, $e$, working in bearings beneath the rollers, and engaging them on the under side of the table, said screw $e$ being revolved by gear $e^1$ meshing into gear $e^2$, which, in turn, meshes into gear $e^5$ on a shaft, $e^4$, having bearings beneath the table A, pulley $e^3$ having motion communicated to it by a belt from a pulley on the main shaft M. Upon shaft $e^4$ is fixed a chain-pulley, $f$, and over this pulley and across the table A runs a chain-belt, F, to and over a chain-pulley, $f^1$, on the other side of said table, as shown. Upon this chain-belt F are secured projecting knives or scrapers $f^2$, at proper or desired distances from each other. Said knives are made open, in the form shown in Fig. 4, to prevent clogging by the bristles during the process of scraping. The pulley $f$ receives motion from the pulley $e^3$ on the end of its shaft, and the chain-belt carrying the knives is thus caused to travel rapidly across the table A. By this means, when the hog leaves the table C, after being subjected to the scraping device D, it is carried by the corrugated rollers E to and upon the belt F. The knives $f^2$, moving rapidly across and along the hog by the motion of a belt, act to scrape off and remove any remaining bristles. To facilitate this operation, the ends of the shaft of the said pulley $f^1$ are made to rest in bearing in the ends of the cross-beams O, which beams O are pivoted at or near the middle of their length to the main frame of the table, and are connected to each other at their rear ends by connecting-beam $O^2$. To the under side of beam $O^2$ is pivoted a downwardly-projecting bar, $O^3$, which bar is also pivoted at its lower end to or near the middle of the foot-lever $O^4$. Said foot-lever is pivoted at its rear end to downwardly-projecting arm $O^5$, which arm is attached at its upper end to the under side of table A. When the foot is pressed on foot-lever $O^4$ it draws the rear ends of cross-beam O downward, which, operating on their pivots, cause the forward ends to move upward, carrying the shaft or pulley $f^1$ therewith, causing an upward pressure of pulley $f^1$, and consequent elevation of chain-belt F, resulting in a stronger pressure of the knives $f^2$ upon the body of the hog, which pressure may be regulated at will by the operator by lighter or heavier pressure on the foot-lever. The scraping of the hog is thus finished by the knives $f^2$.

To prevent the hog from being caught and carried prematurely from the belt F by the rollers E, situated beyond said belt, the roller E' is mounted in bearings in the racks $e^6$, which are arranged to slide vertically in ways in the frame A, and which may be varied, so as to carry the said roller E' out of engagement with the screw $e$, and above the face of the table A, by means of crank-pinions $e^7$, fixed on a transverse shaft, and engaging said racks, as shown. By this means, when the roller E' is raised it acts as a guard to hold the hog over the belt F, and when it is lowered it engages the screw, and the hog is carried by it away from the belt, and may be packed for transportation.

Having thus described my invention, what I claim as new, and desire to secure by Letters Patent, is—

1. In a hog-dressing machine, the open knives or scrapers $f^2$, in combination with the endless belt F and pulleys for operating the same, substantially as and for the purpose set forth.

2. In a hog-dresser, the foot-lever $O^4$, suitably connected with pivoted frame O, in combination with pulley $f^1$ and belt F, said belt provided with knives or scrapers, all substantially as described, and for the purpose set forth.

In testimony that I claim the foregoing as my own I affix my signature in presence of two witnesses.

ISAAC BOONE.

Witnesses:
A. A. HOSMER,
H. J. GRAY.